May 24, 1938.  J. D. COCHRANE, JR  2,118,549
LAMINATED PRODUCT AND PROCESS OF MANUFACTURE
Filed July 20, 1933
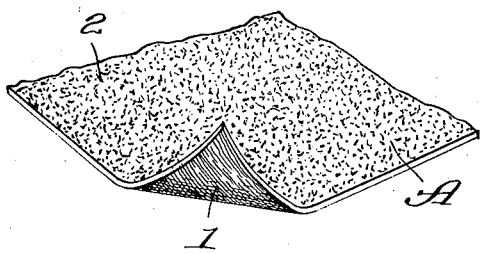
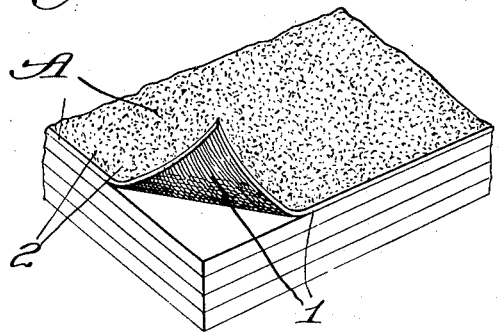
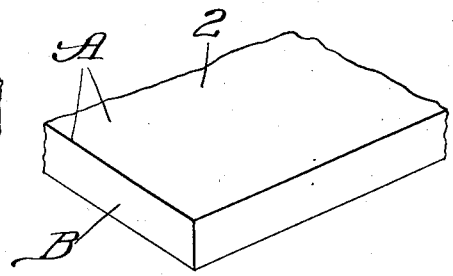
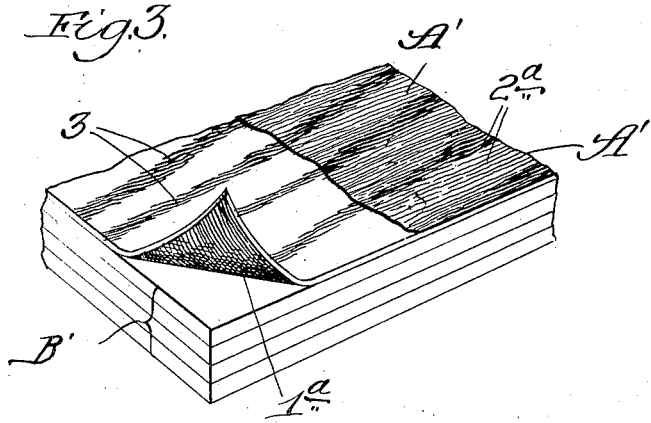
Inventors:
John D. Cochrane, Jr.,
By Dyrenforth, Lee, Chritton & Wiles,
Attys.

Patented May 24, 1938

2,118,549

UNITED STATES PATENT OFFICE 2,118,549

LAMINATED PRODUCT AND PROCESS OF MANUFACTURE

John D. Cochrane, Jr., Cincinnati, Ohio, assignor to The Formica Insulation Company, Cincinnati, Ohio, a corporation of Ohio Application July 20, 1933, Serial No. 681,387

19 Claims. (Cl. 154—2)

This invention relates particularly to an improved laminated product and an improved process of manufacturing the same.

The primary object is to provide for the manufacture of an improved product having a surface-covering, or surface-sheet, employing therein resins of different types which are thoroughly bonded together.

The improved process enables varying results to be obtained, according to desire. For example, one may employ as a top surface-coating a pigmented urea-formaldehyde resin varnish, and may employ as a bonding medium a phenol-formaldehyde resin-varnish for securing the surface-covering to a foundation-body, such as a laminated phenolic condensation product. As another example, one may employ as a surface-coating a pigmented Vinylite varnish, and the surface-covering may be bonded to a foundation-body by means of a phenol formaldehyde resin varnish, for example.

The principle employed is to coat one surface of a sheet of fabric, such as paper, with a resin varnish, preferably pigmented, of one type, and coat the other surface with a bonding resin of a different type. Thus, one may use a more expensive type of resin as a surface-coating and a less expensive resin as a back-surface bonding-coating; and one may, in this manner, produce a superior product at moderate cost. Where a foundation-body comprising a phenol-resin laminated product is employed in the process, an extremely strong and durable finished product having a surface-coating comprising a resin of different type may be produced at moderate cost; also, by initially applying to the back surface of a surface-sheet a bonding-coating comprising phenol-formaldehyde resin, the sheet may be placed in condition to receive a top-surface coating of a resin-varnish which is in solution in a solvent comprising water, and a sheet thus treated may be readily drawn through a drying oven without injury from the presence of water. On the other hand, if a transparent sheet of absorbent paper, for example, be initially coated with a varnish whose solvent comprises water, such sheet becomes swollen and weakened and cannot readily be put through the drying operation in the ordinary manner, as by drawing the sheet through a drying oven.

The invention is illustrated in a preferred embodiment in the accompanying drawing, in which:—

Fig. 1 is a broken perspective view of a surface-sheet having the top surface coated with a pigmented varnish, which may comprise a urea-formaldehyde condensation product, Vinylite resin, or other suitable resin, and having the back surface coated with a resin of a different type, such as a phenol-formaldehyde resin varnish; Fig. 2, a broken perspective view of an assembly comprising a stack of sheets adapted to form a foundation-body and a surface-sheet, such as is shown in Fig. 1; Fig. 2ª, a laminated product produced by consolidating under heat and pressure the assembly shown in Fig. 2; and Fig. 3, a view similar to Fig. 2, but showing the surface-sheet provided with a decorative design.

A resin of the urea-formaldehyde type is a synthetic resin, commonly employed as a varnish, whose solvent comprises at least a moderate percentage of water. Vinylite is well known on the market. It is a synthetic resinoid made by polymerization of vinyl chloride, a compound ordinarily produced from ethylene. The degree of polymerization which the resinoid is given during its manufacture determines the temperature and pressure necessary to cause the resin to flow. Varnish containing the resin is available on the market, such varnish usually containing about 25% solid resin dissolved in acetone. Other ketone type solvents may be used, but acetone is the cheapest known solvent for the resin now available. The acetone varnish can be diluted to some extent with the ester type of lacquer solvents.

Phenol-formaldehyde resin is, of course, a synthetic resin, and has, for many years, been available, in the form of a varnish, for impregnating sheets of fabric, which, after drying, are pressed in a heated hydraulic press to produce a strong, water-resistant laminated product.

A urea-formaldehyde resin and a phenol-formaldehyde resin have radically different physical characteristics, especially with regard to contraction due to change in temperature, humidity, etc. Because of these differences in physical behavior, it is difficult to establish a satisfactory bond between the resins. For example, if one sheet of fabric is saturated with a solution of one of these resins, and another sheet of fabric is saturated with a solution of the other resin, the two sheets will not become satisfactorily bonded together when consolidated into a laminated product under heat and pressure. On the other hand, if a single sheet has one surface impregnated with one of the resins and has the other surface impregnated with the other resin, the resins become satisfactorily bonded when subjected to heat and pressure. This appears to be due to the fact that the resins become physically bonded together in the same matrix of fibres, in a manner not obtainable by superimposing two types of fully saturated sheets in the pressing process. If the phenol-formaldehyde resin be used as a bonding agent between the surface-sheet and a foundation-body comprising a laminated phenol-formaldehyde resin, the bonding between the surface-sheet and the foundation-body also is quite satisfactory.

Referring to Figs. 1 and 2, A designates a surface-sheet; and B designates a foundation-body to which the surface-sheet is applied. The surface-sheet preferably is, ordinarily, a plain sheet of absorbent paper which, if impregnated with a clear varnish and hot-pressed, will become transparent, or semi-transparent. Preferably, this sheet is initially coated, or partially impregnated, at one side with a phenol-formaldehyde resin varnish, as indicated at 1; and the sheet, after drying, is then coated on the other side with a pigmented varnish of different type, as indicated at 2.

The coating indicated at 2 preferably comprises a varnish which is selected with a view to enabling a surface-finish of desired appearance and desired characteristics to be obtained. For this purpose, it is desirable to cut off or neutralize the dark reddish color characteristic of a phenol-formaldehyde resin, such as bakelite.

Examples of a suitable top-surface coating 2 may be given, as follows:

|  | Percent |
|---|---|
| (a) Titanium oxide white pigment (with small percentage of brown dye) | 15 |
| Urea-formaldehyde resin varnish (50% solids) | 80 |
| Finely ground paper fibres | 5 |
| (b) Titanium oxide white pigment (with small percentage red dye) | 30 |
| Vinylite varnish (25% solids) | 55 |
| Acetone | 15 |

Referring to (a), it may be stated that urea-formaldehyde resin varnish is inherently brittle and ordinarily will produce a "crazing" film. The use of ground paper fibres overcomes the tendency to "craze", and gives continuity and uniformity of film, free from "crazing" lines (fine film-ruptures).

Referring to (a) and (b), the use of the pigment gives body to the varnish and prevents undue tendency to flow, so that satisfactory pressing can be obtained between hot plates, as distinguished from closed dies.

The paper fibres, also, aid in giving body to the varnish. The ingredients produce an enamel-like surface which may be of any desired delicate shade of color, depending upon the character of the pigment and dye employed.

The foundation-body B may be assumed to be an assembly of sheets of paper, for example, which have been impregnated with a phenol-formaldehyde resin varnish, dried, cut and stacked. The assembly shown in Fig. 2 may be consolidated in a heated press, thus converting the synthetic resins to the final infusible and substantially insoluble state.

Vinylite is a permanently thermoplastic resin. If desired, the stack of sheets designated B may be first hot-pressed and partially transformed, after which the surface sheet may be applied and hot-pressed upon the foundation-body. If this course be followed, a fresh coat of phenol-formaldehyde resin varnish may be applied to the foundation-body and dried before the second pressing operation, if desired.

Referring to Fig. 3, the surface-sheet is designated A' and the foundation-body is designated B'. The foundation-body may be the same as shown in Fig. 2, or it may be any suitable foundation-body, such as laminated wood, or other material, whether laminated or not. The surface-sheet A' is shown as having applied to its upper surface a printed decorative design, as indicated at 3. This may be an imitation wood-grain, or any other desired design. Over the decorative design is applied a coating 2ª of transparent varnish. This may, for example, be a varnish composed of:

|  | Percent |
|---|---|
| Urea-formaldehyde varnish (50% solids) | 95 |
| Ground paper fibres | 5 |

The back side of the surface-sheet may be assumed to have been initially treated with a coating 1ª of Bakelite varnish. Such a surface-sheet may be consolidated in a heated press with a stack of sheets previously impregnated with bakelite varnish and dried. If desired, any other suitable foundation-body may be substituted, in which event the upper surface of the foundation-body may be coated with Bakelite varnish and dried, previous to the hot-pressing operation. If desired, the surface-sheet A' may be first coated with a varnish-containing pigment, after which the decorative design may be printed upon the pigmented sheet, and thereafter a clear urea-formaldehyde varnish containing ground paper fibres may be applied. After the hot pressing operation, the printed design is seen in relief through the transparent film of urea-formaldehyde resin, the ground paper fibres becoming practically transparent in the hot-pressing operation. Transparent fillers, such as china clay, may be introduced into the surface coating for the purpose of reducing the cost of the coating.

In some instances, it may be desirable to employ a separate bonding-sheet between the surface-sheet shown in Fig. 1 and a foundation-body. For example, if the surface-sheet shown in Fig. 1 is to be applied to composition board, a separate bonding-sheet of paper impregnated with bakelite varnish and dried may be introduced between the surface-sheet A and the foundation-body. Such a bonding-sheet will become firmly bonded to the foundation-body and to the Bakelite coating at the back or inner side of the surface-sheet A. A sheet similar to this separate bonding-sheet may be applied to the bottom surface of the foundation-body, if desired, to serve as a protection against moisture.

While the invention is highly important as applied to surface-sheets and the bonding thereof to a foundation-body, it may be usefully employed, also, in the manufacture of laminated bodies, generally. For example, it is advantageous to employ the principle where a composite is desired having layers impregnated with dissimilar binders to break up vibration frequencies, as in laminated sound-deadening gears. Thus, for example, sheets may be impregnated on one side with Bakelite varnish and on the other side with rubber solution; and the sheets may be stacked with rubber coatings in contact with each other and with Bakelite coatings in contact with each other and then hot-pressed. In this manner, satisfactory bondings may be obtained.

The foregoing detailed description has been given for clearness of understanding only, and no unnecessary limitations should be understood therefrom, but the appended claims should be construed as broadly as permissible in view of the prior art.

What I claim as new and desire to secure by Letters Patent is:

1. The process of producing a laminated product which comprises: applying to a foundation-body a surface-sheet coated on its outer side with a dried pigmented resin varnish and coated on its inner surface with a dried resin varnish of different type adapted to serve as a bonding agent; and consolidating the assembly under heat and pressure.

2. The process stated in claim 1, as practiced by employing in the outer surface coating a synthetic resin of one type and employing in the inner surface coating a synthetic resin of a different type, whereby the two resins will become interlocked in a common matrix in the consolidating operation.

3. The process set forth in claim 1, as practiced by employing in the outer coating a permanently thermoplastic resin and employing in the inner coating a potentially reactive synthetic resin.

4. The process set forth in claim 1 as practiced by employing in the outer coating vinyl chloride resin.

5. The process which comprises: printing a design upon and applying a transparent resin varnish to the outer side of a surface-sheet, and treating the inner side of said surface-sheet with a bonding resin varnish of different type; applying said surface-sheet to a foundation-body having at the contact surface a bonding resin of the same type as the first-mentioned bonding resin; and consolidating the assembly under heat and pressure.

6. For use in producing a laminated product, a surface-sheet having its outer surface coated with a resin-varnish containing pigment and having its inner surface coated with a bonding resin varnish of different type, whereby said resins will, when consolidated under heat and pressure, become interlocked in a common matrix.

7. A surface sheet as specified in claim 6, in which the resin employed in the outer coating is urea-formaldehyde resin.

8. A surface-sheet as specified in claim 6, in which the resin employed in the outer coating is vinyl chloride resin.

9. A surface-sheet as specified in claim 6, in which the resin employed in the outer coating is a urea-formaldehyde resin and the resin employed in the bonding coating is phenol-formaldehyde resin.

10. A surface-sheet as specified in claim 6, in which the resin employed in the outer coating is vinyl chloride resin and the resin employed in the inner coating is a phenol-formaldehyde resin.

11. A laminated product having a surface-sheet with its outer surface impregnated with a pigmented varnish comprising a resin of one type and its inner surface impregnated with a bonding resin varnish of a different type, and a foundation-body having a bonding resin of the second-mentioned type, the assembly having been consolidated under heat and pressure.

12. A laminated product as specified in claim 11, in which the resin of the outer coating is urea-formaldehyde resin.

13. A laminated product as specified in claim 11, in which the resin of the outer coating is vinyl chloride resin.

14. A laminated product as specified in claim 11, in which the resin of the outer coating is urea-formaldehyde resin and the resin of the bonding-coating is phenol-formaldehyde resin.

15. A laminated product as specified in claim 11, in which the resin of the outer coating is vinyl chloride resin and in which the resin of the bonding coating is phenol-formaldehyde resin.

16. The process of producing a laminated product which comprises: applying to a foundation-body a surface-sheet coated on its outer side with a pigmented resin varnish and coated on its inner surface with a resin varnish of a different type adapted to serve as a bonding agent, said foundation-body containing a binder of the same kind as said bonding agent, said surface-sheet being subjected to a drying operation after one coating has been applied and subsequently subjected to a drying operation after the other coating has been applied; and consolidating the assembly under heat and pressure.

17. The process of producing a laminated product which comprises: coating one side of a fibrous surface-sheet with a phenolic resin varnish and drying the sheet; coating the other side of said surface-sheet with a urea-formaldehyde condensation product varnish and again drying the sheet; applying to a foundation-body said surface-sheet thus treated, said foundation-body having a dried phenolic resin varnish at the surface adjacent the dried phenolic resin varnish of the surface-sheet; and consolidating the assembly under heat and pressure.

18. A molded laminated product comprising a core impregnated with a phenolic resin, a fabric having one side treated with a phenolic resin and the other side with a urea resin molded to the core with the surface treated with the urea resin facing outwardly.

19. The method of making molded laminated products comprising the impregnating of a fabric with a phenolic resin, treating one surface of another fabric with a phenolic resin and the other surface with a urea resin, applying a fabric carrying the two resins to the fabric impregnated with a phenolic resin with the surface treated with the urea resin facing outwardly and treating with heat and pressure to produce a molded article.

JOHN D. COCHRANE, Jr.